United States Patent
Ozaki et al.

(10) Patent No.: US 7,216,639 B2
(45) Date of Patent: May 15, 2007

(54) ABNORMALITY DIAGNOSIS DEVICE FOR AIR-FUEL RATIO SENSOR

(75) Inventors: Hisanori Ozaki, Tokyo (JP); Akira Kiyomura, Gunma (JP)

(73) Assignees: Fuji Jukogyo Kabushiki Kaisha, Tokyo (JP); Hitachi, Ltd., Tokyo (JP)

( * ) Notice: Subject to any disclaimer, the term of this patent is extended or adjusted under 35 U.S.C. 154(b) by 0 days.

(21) Appl. No.: 11/437,674

(22) Filed: May 22, 2006

(65) Prior Publication Data

US 2006/0265116 A1  Nov. 23, 2006

(30) Foreign Application Priority Data

May 23, 2005 (JP) .............................. 2005-149873

(51) Int. Cl.
*F02D 41/14* (2006.01)
(52) U.S. Cl. ...................... 123/674; 123/688; 123/690; 701/103; 701/107; 701/109
(58) Field of Classification Search ................ 123/674, 123/688, 690; 701/103, 107, 109
See application file for complete search history.

(56) References Cited

U.S. PATENT DOCUMENTS

| | | | | |
|---|---|---|---|---|
| 5,819,195 A | * | 10/1998 | Iwata | 123/688 |
| 5,964,208 A | * | 10/1999 | Yamashita et al. | 123/688 |
| 5,983,875 A | * | 11/1999 | Kitagawa et al. | 123/674 |
| 6,032,659 A | * | 3/2000 | Yamashita et al. | 123/674 |
| 6,842,690 B2 | * | 1/2005 | Akao et al. | 701/103 |
| 6,922,985 B2 | * | 8/2005 | Wang et al. | 701/107 |
| 7,063,081 B2 | * | 6/2006 | Yamada | 701/109 |

FOREIGN PATENT DOCUMENTS

JP  10-169493  6/1998

\* cited by examiner

*Primary Examiner*—Erick Solis
(74) *Attorney, Agent, or Firm*—Smith, Gambrell & Russell LLP

(57) ABSTRACT

When carrying out abnormality determination for an air-fuel ratio sensor 33 by comparison of an average value tave of all diagnostic values t(n) and an abnormality determination value C, the abnormality determination value C is corrected using an average value Δtave for the disturbance correction values Δt(n). A disturbance correction value Δt(n) is derived by subtracting a correction reference value A, which is a diagnostic value with a normal air-fuel ratio sensor 33 when there is no disturbance, from the diagnostic value t(n). The present invention provides the abnormality diagnosis device for the air-fuel ratio sensor that can acquire highly precise diagnosis results without lowering frequency of diagnosis accurately taking into consideration the influence of disturbance.

16 Claims, 5 Drawing Sheets

FIG.5A

| NUMBER OF TIMES OF DIAGNOSIS n | DIAGNOSTIC VALUE t (n) | DISTURBANCE CORRECTION VALUE Δt (n) |
|---|---|---|
| 1 | 850 | 0 |
| 2 | 1100 | 0 |
| 3 | 1050 | 0 |
| 4 | 1150 | 0 |
| 5 | 1050 | 0 |
| AVERAGE | 1040 | 0 |

FIG.5B

| NUMBER OF TIMES OF DIAGNOSIS n | DIAGNOSTIC VALUE t (n) | DISTURBANCE CORRECTION VALUE Δt (n) |
|---|---|---|
| 1 | 840 | 440 |
| 2 | 460 | 60 |
| 3 | 1300 | 0 |
| 4 | 820 | 420 |
| 5 | 840 | 440 |
| AVERAGE | 852 | 272 |

ABNORMALITY DIAGNOSIS DEVICE FOR AIR-FUEL RATIO SENSOR

This application claims benefit of Japanese Application No. 2005-149873 filed on May 23, 2005, the contents of which are incorporated by this reference.

BACKGROUND OF THE INVENTION

1. Field of the Invention

The present invention relates to an abnormality diagnosis device for a wide range air-fuel ratio sensor for detecting a air-fuel ratio in a linear manner ranging from rich mixture to lean mixture, including a stoichiometric air-fuel ratio from oxygen concentration in exhaust gas from an engine.

2. Description of Related Art

Conventionally, as technology for carrying out abnormality diagnosis for a wide range air-fuel ratio sensor, technology is known for, when the engine is in a predetermined operating state (steady state), carrying out prescribed air-fuel ratio control to measure a diagnostic value relating to response of the air-fuel ratio sensor, and determining an air-fuel ratio abnormality when this diagnostic value exceeds an abnormality determination value.

However, in order to obtain a highly precise diagnostic result using this type of abnormality diagnosis it is preferable to carry out the final decision as to whether or not the air-fuel ratio sensor has an abnormality based on diagnostic values that have been continuously and repeatedly measured a plurality of times. To this end, Japanese patent laid-open No. 10-169493 discloses technology for repeatedly measuring with a time from when a target air-fuel ratio has inverted from lean mixture to rich mixture, until a detected value for the air-fuel ratio sensor crosses a target air-fuel ratio (rich side target value) as a diagnostic value, and when the diagnostic value exceeds a specified value (abnormality determination value) twice in succession, or when a diagnostic value for a specified proportion exceeds the abnormality determination value, an air-fuel ratio sensor abnormality is determined.

On the other hand, with this type of abnormality diagnosis, a prerequisite is that a steady state of the engine be maintained continuously, and if a transient state such as acceleration or deceleration or the like intervenes at the time of measuring the diagnostic value it is difficult to acquire a correct diagnostic result due to this disturbance.

Therefore, with technology for measuring a diagnostic value a plurality of time at the time of abnormality diagnosis, as with the technology disclosed in the patent publication described above, there are limited opportunities where abnormality diagnosis can be executed, and there is concern that it is difficult to ensure sufficient frequency of diagnosis.

The present invention has been conceived in view of the above described situation, and an object of the invention is to provide an abnormality diagnosis device for an air-fuel ratio sensor that can acquire highly precise diagnosis results without lowering frequency of diagnosis.

SUMMARY OF THE INVENTION

An abnormality diagnosis device for an air-fuel ratio sensor of the present invention comprises: diagnostic value measurement control means for, when an engine is in a predetermined operating state, measuring a diagnostic value relating to response to the air-fuel ratio sensor a plurality of times by carrying out predetermined air-fuel ratio control; abnormality determination means, for determining whether or not the air-fuel ratio sensor has an abnormality based on comparison of an average value of each of the diagnostic values and a predetermined abnormality determination value; disturbance correction value calculation means for respectively comparing each diagnostic value measured by the diagnostic value measurement control means with a correction allowable upper limit value that is set in advance to a value between an average value of each normal diagnostic value, measured in advance a plurality of times using a normal air-fuel ratio sensor, and an average value of each abnormality diagnostic value, measured in advance a plurality of times using an abnormality air-fuel ratio sensor, and, if the diagnostic value is smaller than the correction allowable upper limit value, calculating a disturbance correction value by subtracting a predetermined correction standard value from the diagnostic value, while if the diagnostic value is larger than the correction allowable upper limit value, setting the disturbance correction value to zero for the diagnostic value; and correction means for, at the time of determination by the abnormality determination means, correcting a relative relationship between an average value of the diagnostic values and the abnormality determination value based on an average value of the disturbance correction values.

BRIEF DESCRIPTION OF THE DRAWINGS

FIG. 5A is a table showing one example of diagnostic values and disturbance correction values.

FIG. 5B is a table showing one example of diagnostic values and disturbance correction values.

DETAILED DESCRIPTION OF THE PREFERRED EMBODIMENTS

Figure 3:
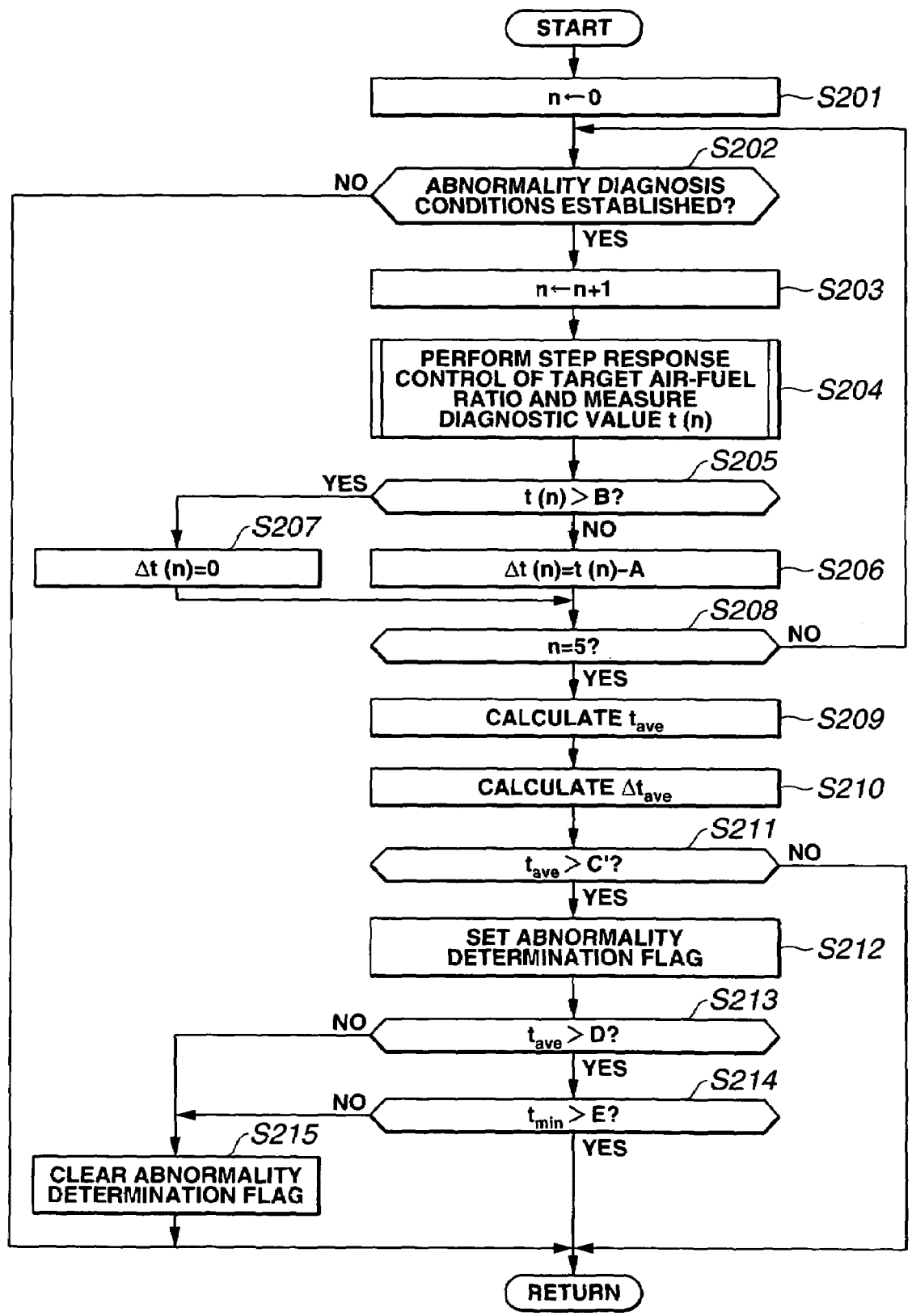
FIG. 3 is a flowchart showing abnormality diagnostic routine of an air-fuel ratio sensor.
Figure 4:
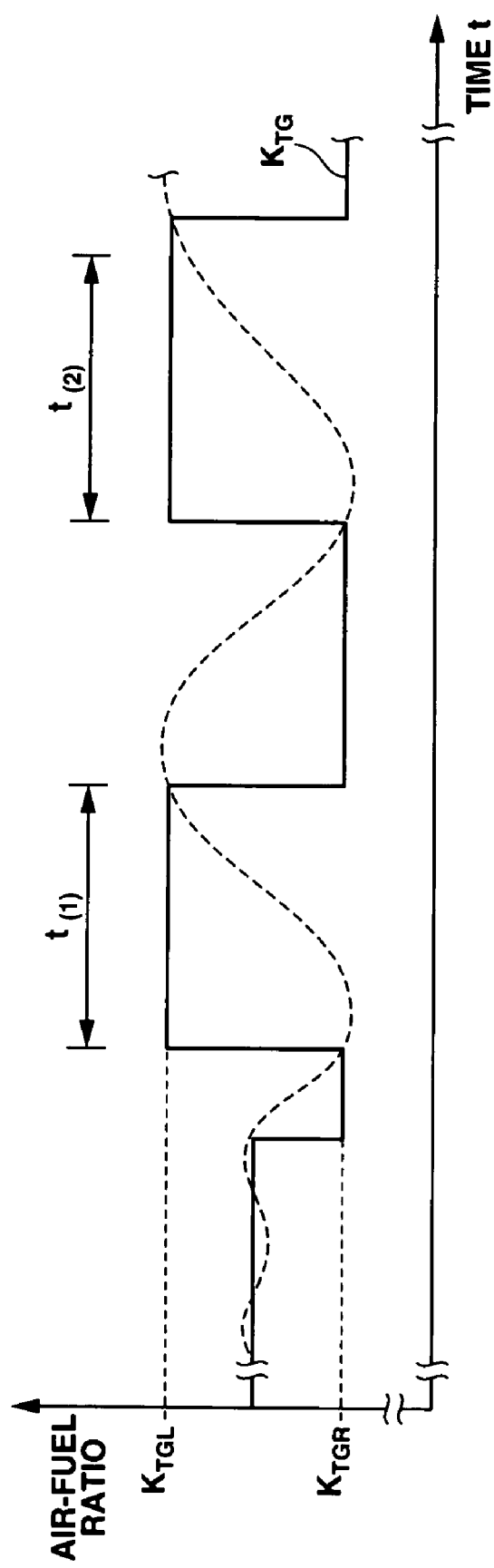
FIG. 4 is a timing chart showing a relationship between target air-fuel ratio and air-fuel ratio sensor output at the time of air-fuel ratio step response control.

Embodiments of the present invention will be described in the following with reference to the drawings. The drawings relate to one embodiment of the present invention, with FIG. 1 being a schematic configurational drawing of an engine control system, FIG. 2 being a flowchart showing a setting routine for fuel injection pulse width and injection timing, FIG. 3 being a flowchart showing abnormality diagnostic routine of an air-fuel ratio sensor, FIG. 4 is a timing charts showing a relationship between target air-fuel ratio and air-fuel ratio sensor output at the time of air-fuel ratio step response control, and FIG. 5A and FIG. 5B being tables showing one example of diagnostic values and disturbance correction values.

Figure 1:
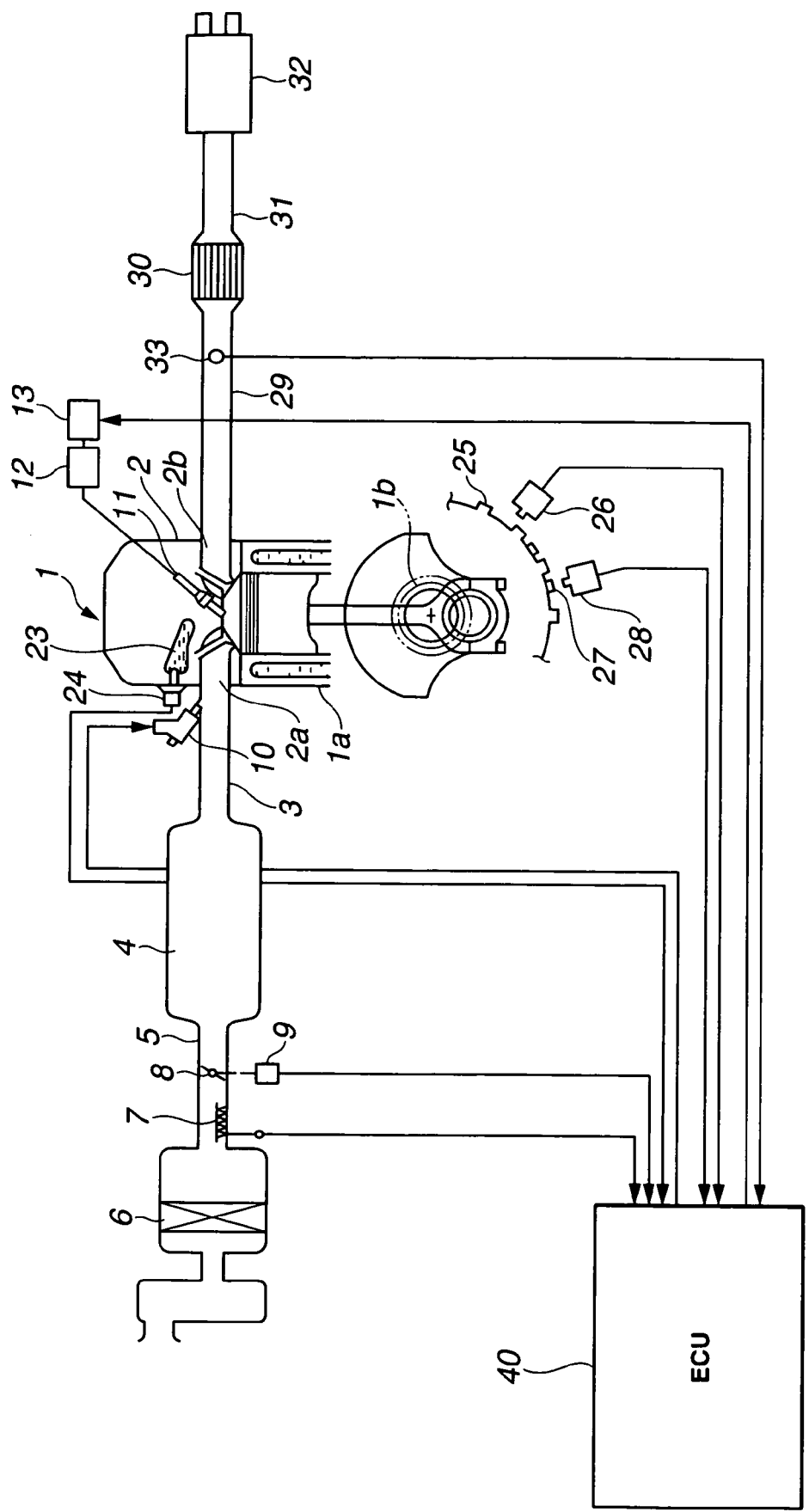
FIG. 1 is a schematic configurational drawing of an engine control system.

In FIG. 1, reference numeral 1 represents an engine, and in this embodiment it is a horizontally opposed four-cylinder engine. An intake manifold 3 is connected to each intake port 2a formed in a cylinder head 2 of the engine 1, and an intake pipe 5 is connected to the intake manifold 3 via an air chamber 4 for gathering together intake passages of each cylinder.

Also, an air cleaner 6 is attached to an air intake side of the intake pipe 5, and an air flow sensor 7 of a hot-wire type, for example, is fitted downstream of the air cleaner 6.

Further, a throttle valve 8 is fitted mid-way along the intake pipe 5, and a throttle sensor 9 for detecting throttle opening degree is connected to the throttle valve 8.

A fuel injector 10 faces to a directly upstream side of each intake port 2a for each cylinder, in the intake manifold 3. Spark plugs 11 having tips exposed in a combustion chamber are attached for each cylinder in the cylinder head 2. An ignition coil 12 is connected to the spark plugs 11, and an igniter 13 is connected to the ignition coil 12.

An engine coolant temperature sensor 24 is provided in a coolant passage 23 formed in the cylinder head 2 of the engine 1. A crank rotor 25 for crank angle detection is axially fitted to a crankshaft 1b that is supported in bearings in a cylinder block 1a, and a crank angle sensor 26 made from an electromagnetic pickup, for example, is fitted on the outer periphery of the crank rotor 25. A crank rotor 27 for cylinder determination is axially fitted to the crankshaft 1b so as to be coaxial with the crank rotor 25 for crank angle detection, and a cylinder determination sensor 28 made from an electromagnetic pickup, is fitted on the outer periphery of the crank rotor 27 for cylinder determination.

Also, each exhaust port 2b of the cylinder head 2 is connected to an exhaust manifold 29 having a confluence portion where the exhaust passages from each cylinder are joined. An exhaust pipe 31 is connected to the confluence portion via a catalytic converter 30. A muffler 32 is arranged at a rear end of the exhaust pipe 31, and an air-fuel ratio sensor (wide range air-fuel ratio sensor) 33 for detecting air-fuel ratio in an linear manner ranging from rich mixture to lean mixture, including a stoichiometric air-fuel ratio, from oxygen concentration in exhaust gas is interposed at an upstream side of the catalytic converter 30.

Reference numeral 40 in the drawing represents an electronic control unit (ECU) for carrying out electronic control of the engine 1. The ECU 40 is mainly comprised of a microcomputer, and functions to execute engine control every specified period, in accordance with a control program stored in memory, by reading in output signals from each sensor and switch to detect engine operating state, and calculate fuel injection quantity (fuel injection pulse width) and fuel injection timing, ignition timing etc. based on the detected engine operating condition.

Figure 2:
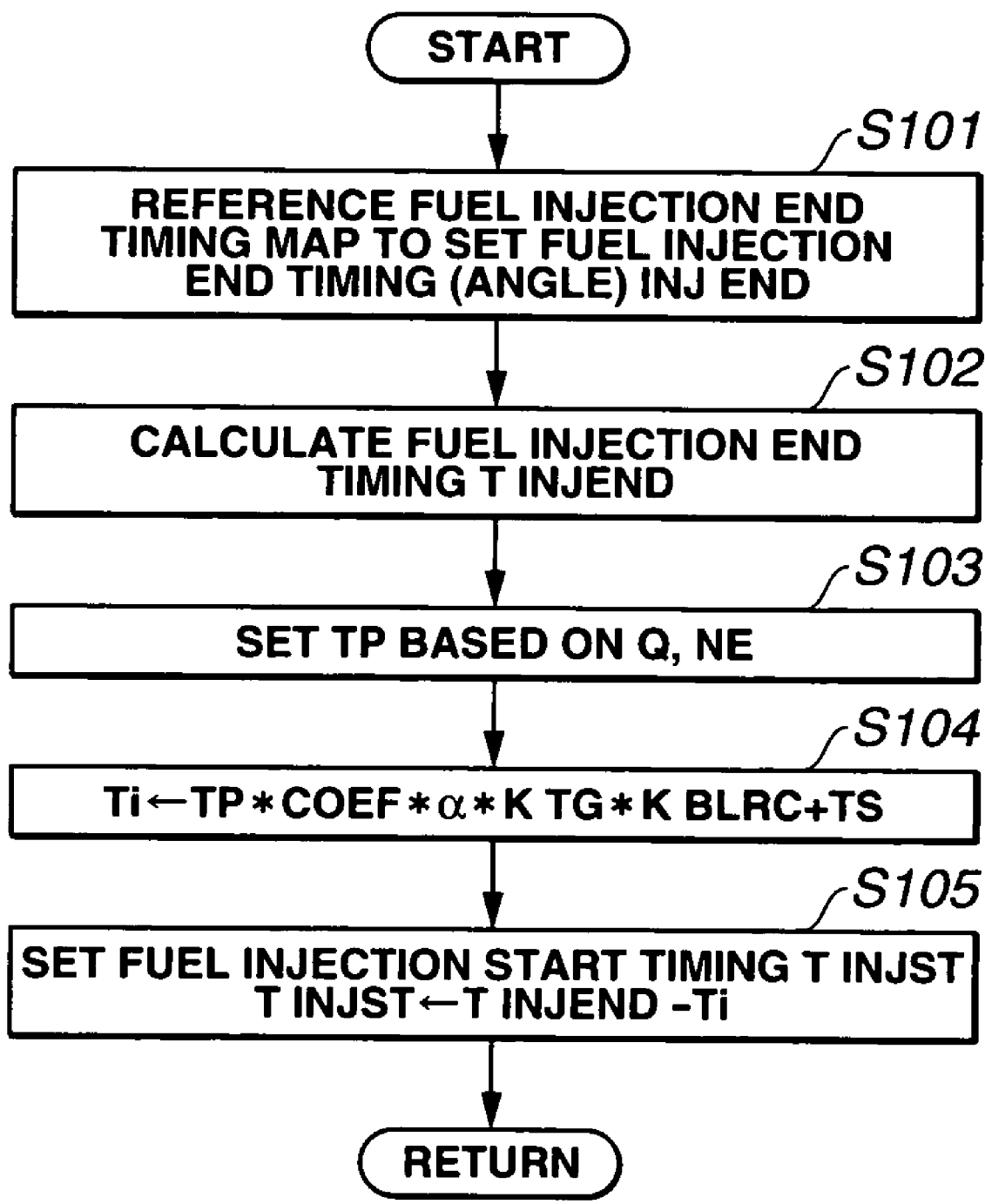
FIG. 2 is a flowchart showing a setting routine for fuel injection pulse width and injection timing.

Next, description will be given of a routine for setting fuel injection pulse width and fuel injection timing executed in the ECU 40, in accordance with the flowchart shown in FIG. 2. This routine is repeatedly executed every predetermined time, and first of all, in step S101 the ECU 40 sets fuel injection end period (angle) INJEND by interpolation calculation, with reference to a fuel injection end magnetism map stored in ROM based, for example, on engine coolant temperature TW detected by the engine coolant temperature sensor 24.

Continuing on, in step S102 the ECU 40 calculates fuel injection end timing TINJEND. The fuel injection end timing TINJEND is time data converted from the fuel injection end period INJEND, as angular data, using well known calculation, with a reference crank angle signal (θ1 pulse) input from the crank angle sensor 26 as a reference.

When processing advances to step S103, the ECU 40 sets a basic fuel injection pulse width TP using calculation or map referencing on the basis of engine rotational speed NE that is based on output signals from the crank angle sensor 26, and intake air amount Q, that is based on output signals from the air flow sensor 7.

After that, in step S104, the ECU 40 corrects the basic fuel injection pulse width TP using various increment correction coefficients COEFs, such as mixture ratio correction, high load correction, air conditioner increment correction etc., air-fuel ratio feedback correction coefficient α, target air-fuel ratio KTG, learning correction coefficient KBLRC for correcting for degradation over time of various sensors etc., and voltage correction coefficient Ts(Ti←Tp·COEF·α·KTG·KBLRC+TS).

Next, in step S105, the ECU 40 sets a fuel injection start timing, that is a fuel injection start timing TINJST, with θ1 pulse as a reference, based on fuel injection pulse width Ti and fuel injection end timing TINJEND, (TINJST←TINJEND−Ti), and the routine exits. In this way, the fuel injection timing is variably set during from the exhaust stroke to the intake stroke of the engine 1.

At the time of control as described, the ECU 40 performs abnormality diagnosis for the air-fuel ratio sensor 33 when the engine 1 reaches a predetermined operating state. Here, when the operating state of the engine 1 has reached a predetermined steady state after warming up of the engine 1, the ECU 40 determines that an abnormality diagnosis condition has been established and executes abnormality diagnosis for the air-fuel ratio sensor 33.

If the abnormality diagnosis condition has been established, the ECU 40 continuously measures a diagnostic value t(n), relating to response of the air-fuel ratio sensor 33, and repeats the measurement for a plurality of times (for example five times) by performing a predetermined air-fuel ratio control. The ECU then determines whether or no there is an abnormality with the air-fuel ratio sensor 33 based on comparison of an average value tave of the diagnostic values t(n) and a predetermined abnormality determination value C. Specifically, the ECU 40 determined that the air-fuel ratio sensor 33 has an abnormality when the average value tave of the diagnostic values is larger than the abnormality determination value C.

At the time of the abnormality determination, the ECU 40 compares each diagnostic value t(n) with a predetermined correction allowable upper limit value B. When the diagnostic value t(n) is smaller than the correction allowable upper limit value B, the ECU 40 calculates a disturbance correction value Δt(n) using a predetermined correction reference value A by the following equation (1).

$$\Delta t(n)=t(n)-A \quad (1)$$

On the other hand, when the diagnostic value t(n) is larger than the correction allowable upper limit value B, the ECU 40 sets the disturbance correction value Δt(n) for the diagnostic value t(n) to zero.

Then, when the ECU 40 performs the above described abnormality determination based on comparison of the average value tave for the diagnostic values t(n) and the abnormality determination value C, the determination result being affected by disturbance is suppressed by correcting a relative relationship between the average value tave of the diagnostic values and the abnormality determination value C based on an average value Δtave for the disturbance correction values Δt(n).

Also, in this embodiment, the ECU 40 carries out abnormality determination that is different from the above described abnormality determination, in order to achieve versatile abnormality diagnosis for the air-fuel ratio sensor 33. Specifically, the ECU 40 compares an average value tave for the diagnostic values t(n) with a second abnormality determination value D that is set larger than the abnormality determination value C, and if the average value tave for the diagnostic values is larger than the second abnormality determination value D it is determined that the air-fuel ratio sensor 33 has an abnormality. Also, the ECU 40 compares a minimum value tmin of each of the diagnostic values t(n) with a third abnormality determination value E that is set smaller than the abnormality determination value C, and if the minimum value tmin of the diagnostic values is larger than the third abnormality determination value E it is determined that the air-fuel ratio sensor 33 has an abnormality.

Then, even if it has been determined by the abnormality determination using abnormality determination value C that the air-fuel ratio sensor 33 has an abnormality, if it is determined by other abnormality determination that the air-fuel ratio sensor 33 does not have an abnormality, the previous determination that the air-fuel ratio sensor 33 has an abnormality is canceled. That is, the ECU 40 outputs a final diagnosis result that the air-fuel ratio sensor 33 has an abnormality when all abnormality determinations using each of the abnormality determination values C–E have determined the air-fuel ratio sensor 33 to have an abnormality.

In this way, in this embodiment, the ECU 40 realizes each of the functions as diagnostic measurement control means, abnormality determination means, disturbance correction calculation means, correction means and abnormality determination cancel means.

Here, in this embodiment, the correction reference value A, correction allowable upper limit value B, abnormality determination value C, second abnormality determination value D and third abnormality determination value E are set as shown in the following using, for example, respective normal diagnostic values tOK(m) repeatedly measured in advance a number of times with a normal air-fuel ratio sensor, and respective abnormality diagnostic values tNG (m) repeatedly measured in advance a number of times with an abnormal air-fuel ratio sensor.

Specifically, the correction reference value A is set to a specified value with an average value tOKave for respective normal diagnostic values tOK(m) as a reference. In this embodiment, specifically, the correction reference value A=tOKave=400. In this way, the correction reference value A is set to a standard diagnostic value obtained by a normal air-fuel ratio sensor 33 when there is no disturbance.

Also, the correction allowable upper limit value B is set to a specified value between, for example, an average value tOKave for respective normal diagnostic values tOK(m) and an average value tNGave for respective abnormality diagnostic values tNG(m). Preferably, the correction allowable upper limit value B is set to a specified value, with a value derived by subtracting a predetermined value, having a maximum value of four times the standard deviation σNG of normal distribution of the respective abnormality diagnostic values tNG(m), from the average value tNGave of the respective abnormal values, as a reference. For example, in the embodiment, the value of double is used, specifically the correction allowable upper limit B=tNGave−2·σNG=850. Here, the correction allowable upper limit value B can also be set to a specified value with a value that is derived by adding a value of four times the standard deviation σOK of normal distribution of the respective normal diagnostic values tOK(m) to the average value tOKave of the respective normal diagnostic values as a reference, and can also be set to a specified value limited between (tOKava+4·σOK) and (tNGava−2·σNG). In this way, when it is assumed that the diagnostic value t(n) will be affected by disturbance due to transient response of the engine 1 etc., it is difficult to say that the air-fuel ratio sensor 33 is normal, but the correction allowable upper limit value B is set to a value that will not necessarily determine that there is an abnormality.

Also, the abnormality determination value C is set to a specified value with an average value tNGave for respective abnormality diagnostic values as a reference. In this embodiment, specifically, the abnormality determination value C=tNGave=850. In this way, the abnormality determination value C is set to a value for accurately acquiring abnormality determination for the air-fuel ratio sensor 33 based on an average value tave of the diagnostic values when it is assumed that each diagnostic value will not be affected by any disturbance.

Also, the second abnormality determination value D is set to a specified value with a value, derived by adding the standard deviation σNG of normal distribution of the respective abnormality diagnostic values tNG (m) to the average value tNGave of the respective abnormality diagnostic values, as a reference, for example. In this embodiment, specifically, the second abnormality determination value D=tNGave+σNG=1020.

Also, the third abnormality determination value D is set to a specified value with a value, derived by subtracting a predetermined value having a maximum value of eight times the standard deviation σNG of normal distribution of the respective abnormality diagnostic values tNG(m), for example, a value of four to five times, from the average value tNGave of the respective abnormality diagnostic values, as a reference, for example. In this embodiment, specifically, the third abnormality determination value E=584.

Incidentally, in order to improve the diagnostic precision depending on the specifications of the air-fuel ratio sensor 33 etc., it is of course possible to subject the above described correction reference value A, correction allowable upper limit value B, abnormality determination value C, second abnormality determination value D and third abnormality determination value E to suitable tuning with respect to each of the above described reference values.

Next, description will be given of an abnormality routine for the air-fuel ratio sensor 33 executed in the ECU 40, in accordance with the flowchart shown in FIG. 3.

When this routine is started, the ECU 40 first of all clears a counter n representing a number of times a diagnostic value t(n) is measured in step S201 (n←0).

Continuing on, in step S202, the ECU 40 investigates whether or not abnormality diagnostic conditions have been established for the air-fuel ratio sensor 33, and if it is determined that the abnormality diagnostic conditions have not been established the routine exits directly. Conversely, if it is determined in step S202 that abnormality diagnostic conditions have been established, the ECU 40 advances processing to step S203.

If processing advances from step S202 to step S203, the ECU 40 increments the counter n (n←n+1), and advances to step S204 where a target air-fuel ratio KTG (namely the target air-fuel ratio KTG in the processing of step S104 described above) at the time of setting fuel injection pulse width Ti is subjected to step response control to measure diagnostic value t(n).

Specifically, as shown in FIG. 4, in step S204 the ECU 40 subjects the target air-fuel ratio KTG to step response control using specified rich mixture side target air-fuel ratio KTGR and lean mixture side target air-fuel ratio KTGL, and a time from the point in time where the target air-fuel ratio KTG inverts from the lean mixture side target air-fuel ratio KTGL to the rich mixture side target air-fuel ratio KTGR, until the detection value of the air-fuel ratio sensor 33 crosses the lean mixture side target air-fuel ratio KTGL, is measured as diagnostic value t(n). Incidentally, it is also possible to measure, as the diagnostic value t(n), the time from the point in time at which target air-fuel ratio KTG inverts from the rich mixture side target air-fuel ratio KTGR to the lean mixture side target air-fuel ratio KTGL until the detection value of the air-fuel ratio sensor 33 crosses the rich mixture side target air-fuel ratio KTGR.

Continuing on, in step S205 the ECU 40 investigates whether or not the measured diagnostic value t(n) is larger than the correction allowable upper limit value B. If it is determined in step S205 that the diagnostic value t(n) is less than or equal to the correction allowable upper limit value B, then the ECU 40 advances to step S206 where a disturbance correction value Δt(n) is calculated using equation (1) mentioned above, and then advances to step S208. On the other hand, if it is determined in step S205 that the diagnostic value t(n) is larger than the correction allowable upper limit value B, then the ECU 40 advances to step S207 where a disturbance correction value Δt(n) is set to "0", and then advances to step S208.

Specifically, when the diagnostic value t(n) is less than or equal to the correction allowable upper limit value B, there is a possibility of the diagnostic value t(n) being offset more than normal because of transient response of the engine 1, etc., and so a value (disturbance correction value Δt(n)) that takes into consideration the inclusion of the offset amount in the diagnostic value t(n) is calculated in step S206.

Once processing advances from step S206 or step S207 to step S208, the ECU 40 checks whether or not the counter n has reached "5" (that is, whether or not diagnostic values t(1) to t(5) have been sequentially measured and disturbance correction values Δt(1) to Δt(5) calculated), and if the counter n is not equal to 5 returns to step S102.

On the other hand, if it is determined that the counter n=5 in step S208, the ECU 40 advances to step S209 where tave, which is an average value of diagnostic values t(1) to t(5), is calculated, then in step S210 Δtave, which is an average value of the disturbance correction values Δt(1) to Δt(5), is calculated, and finally advances to step S211.

In step S211, the ECU 40 corrects the abnormality determination value C using the following equation (2) based on the average value Δtave of the disturbance correction values, and performs determination as to whether or not the air-fuel ratio sensor 33 has an abnormality based on comparison of a corrected value C' for the abnormality determination value C and the average value tave of the diagnostic values.

$$C'=C+(\Delta tave \cdot k) \qquad (2)$$

Here, in equation (2), "k" is an adjustment coefficient for adjusting the abnormality determination value C by using Δtave. When disturbance acts on the diagnostic value t(n) of the normal air-fuel ratio sensor 33, by using this adjustment coefficient k, it is possible to obtain an abnormality determination value which is equivalent to the value in the standard state with no disturbance. In this embodiment, this adjustment coefficient k seeks on the basis of experiments or the like, for example, k=1.662.

In step S211, when the average value tave of the diagnostic values is less than or equal to the corrected value C' of the abnormality determination value, the ECU 40 determines that the air-fuel ratio sensor 33 is normal, and directly exits the routine. Specifically, the ECU 40 determines, as a final diagnostic result, that the air-fuel ratio sensor 33 is working normally.

On the other hand, when, in step S211, the average value tave of the diagnostic values is larger than the corrected value C' of the abnormality determination value, the ECU 40 determines that the air-fuel ratio sensor 33 has an abnormality, advances to step S212 where an abnormality determination flag F for the air-fuel ratio sensor 33 is set (F←1), and then advances to step S213.

When processing advances from step S212 to step S213, the ECU 40 determined whether or not the air-fuel ratio sensor 33 has an abnormality based on comparison of the average value tave of the diagnostic values and the second abnormality determination value D. Then, in step S213, if the average value tave of the diagnostic values is larger than the second abnormality determination value D, the ECU 40 determines that the air-fuel ratio sensor 33 has an abnormality, and advances directly to step S214 with the abnormality determination flag F still set to "1".

Conversely, if, in step S213, the average value tave of the diagnostic values is less than or equal to the second abnormality determination value D, the ECU 40 determines that the air-fuel ratio sensor 33 is normal, and advances to step S215.

When processing advances from step S213 to step S214, the ECU 40 determines whether or not the air-fuel ratio sensor 33 has an abnormality based on comparison of minimum value tmin of the diagnostic values and the third abnormality determination value E.

Then, in step S214, if the minimum value tmin of the diagnostic values is larger than the third abnormality determination value E, the ECU 40 determines that the air-fuel ratio sensor 33 has an abnormality, and directly the routine with the abnormality determination flag F still set to "1" exits. Specifically, the ECU 40 determines, as a final diagnostic result, that the air-fuel ratio sensor 33 has an abnormality.

Conversely, if, in step S214, the minimum value tmin of the diagnostic values is less than or equal to the third abnormality determination value E, the ECU 40 determines that the air-fuel ratio sensor 33 is normal, and advances to step S215.

Then, when processing advances to step S215 from step S213 or step S214, the ECU clears the abnormality determination flag F for the air-fuel ratio sensor 33 (F←0), and then exits the routine. Specifically, the ECU 40 cancels the determination of the abnormality for the air-fuel ratio sensor 33, which was the previous determination result, and determines that the air-fuel ratio sensor 33 is working normally, as a final diagnostic result.

Next, a specific example of the above embodiment will be described.

As each diagnostic value t(n), for example, when the diagnostic values shown in FIG. 5A were measured, every one of these diagnostic values t(1) to t(5) is larger than the correction allowable upper limit value B (=850), and so in step S207 the ECU 40 sets Δt(1)=Δt(2)=Δt(3)=Δt(4)=Δt(5) =0. Also, in step S209 the ECU 40 calculates tave=1040, and in step S210 calculates Δtave=0. Then, C'=850+(0·1.66) =850, and a relationship of tave>C' (1040>850) is established, and so in step S211 the ECU 40 determines that the air-fuel ratio sensor 33 has an abnormality. Further, in step S213, a relationship of tave>D(1040>1020) is established, and in step S214 a relationship of tmin>E(850>510) is established, and so the ECU 40 determines that the air-fuel ratio sensor 33 has an abnormality as a final diagnostic result.

Also, as each diagnostic value t(n), for example, when the diagnostic values shown in FIG. 5B were measured, the diagnostic values t(1), t(2), t(4) and t(5) are smaller than the correction allowable upper limit value B (=850), and so in step S206 the ECU 40 calculates Δt(1)=440, Δt(2)=60, Δt(4)=420 and Δt(5)=440. Also, since diagnostic value t(3) is larger than the correction allowable value B the ECU 40 sets Δt(3)=0 in step S207. Also, in step S209 the ECU 40 calculates tave=852, and in step S210 calculates Δtave=272. Then, C'=850+(272·1.66)=1302, and a relationship of tave>C' (852>1302) is not established, and so in step S211 the ECU 40 determines that the air-fuel ratio sensor 33 is normal. Specifically, the ECU 40 determines, as a final diagnostic result, that the air-fuel ratio sensor 33 is working normally.

According to this embodiment, when the diagnostic value t(n) is smaller than the correction allowable upper limit value B, an offset amount in the diagnostic value t(n) is calculated as a disturbance correction value Δt(n). The disturbance correction value Δt(n) is calculated by subtracting the correction reference value A, which is a reference diagnostic value obtained with a normal air-fuel ratio sensor 33 when there is no disturbance, from the diagnostic value t(n). And after correcting the abnormality determination value C by using an average value Δtave of the disturbance correction values Δt(n), abnormality determination for the air-fuel ratio sensor 33 is performed based on comparison of an average value tave of all the diagnostic values t(n) and the abnormality determination value C. Therefore it is possible to perform abnormality determination for the air-fuel ratio sensor 33 accurately taking into consideration the influence of disturbance by correcting the abnormality determination value C using an average value Δtave for the disturbance correction values Δt(n).

Accordingly, it is possible to moderate conditions etc. when determining whether or not the operating state of the engine 1 is a steady state (that is, it is possible to moderate abnormality determination conditions), and even when carrying out abnormality determination for the air-fuel ratio sensor 33 based on diagnostic values continuously and repeatedly measured a number of times, it is possible to obtain highly precise diagnostic results while suppressing lowering of the diagnosis frequency.

Also, the correction allowable upper limit value B is a specified value between an average value tOKave of the normal diagnostic values tOK(m) and an average value tNGave of the abnormality diagnostic values tNG(m). In the case where it is assumed that the diagnostic values t(n) have been influenced by disturbance due to transient response of the engine 1 etc. it is difficult to say that the air-fuel ratio sensor 33 is normal, but it is possible to accurately eliminate diagnostic values t(n) taking into consideration the possibility that they may have been affected by disturbance, by setting the correction allowable upper limit value B to a value that will not necessarily determine that there is an abnormality. Specifically, it is possible to set the correction allowable upper limit value B to an appropriate value by using as a reference a value derived by subtracting a predetermined value, having a maximum value that is four times the standard deviation σNG of normal distribution of the abnormality diagnostic values tNG(m), from the average value tNGave of the abnormality diagnostic values, a value derived by adding a predetermined value, having a maximum value of eight times the standard deviation σOK of normal distribution of the normal diagnostic values tOK(m), to the average value tOKave of the normal diagnostic values, or both of these values references.

Also, the correction reference value A is set to a specified value with the average value tOKave of the normal diagnostic values as a reference. It is possible to calculate a suitable disturbance correction value Δt(n) by setting to a reference diagnostic value obtained with a normal air-fuel ratio sensor when there is no disturbance.

Further, abnormality determination of the air-fuel ratio sensor 33 is carried out based on the second abnormality determination value D and the third abnormality determination value E, using each of the diagnostic values t(n). And when it is determined that the air-fuel ratio sensor 33 is normal in either determination, final determination that the air-fuel ratio sensor 33 has an abnormality is not carried out. Therefore it is possible to perform the diagnosis for the air-fuel ratio sensor 33 in a diverse manner and to accurately reduce erroneous determination that the air-fuel ratio sensor 33 has an abnormality.

Incidentally, with the above described embodiment, a description has been given for one example where, when carrying out abnormality determination for the air-fuel ratio sensor 33 based on comparison of an average value tave of the diagnostic values t(n) and the abnormality determination value C, the abnormality determination value C is corrected based on an average value Δtave of the disturbance correction values Δt(n), but the present invention is not thus limited, and it goes without saying that it is also possible, for example, to correct the average value tave of the diagnostic values instead of the abnormality determination value C, using the following equation (3).

$$tave' = tave - (\Delta tave \cdot k) \quad (3)$$

Specifically, with the present invention it is possible to have a structure whereby, when performing abnormality determination for the air-fuel ratio sensor 33 based on comparison of the average value tave of the diagnostic values t(n) and the abnormality determination value C, a relative relationship between these values can be corrected based on the average value Δtave for the disturbance correction values Δt(n).

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An abnormality diagnosis device for an air-fuel ratio sensor, comprising:

diagnostic value measurement control means for, when an engine is in a predetermined operating state, measuring a diagnostic value relating to response to the air-fuel ratio sensor a plurality of times by carrying out predetermined air-fuel ratio control;

abnormality determination means, for determining whether or not the air-fuel ratio sensor has an abnormality based on comparison of an average value of each of the diagnostic values and a predetermined abnormality determination value;

disturbance correction value calculation means for respectively comparing each diagnostic value measured by the diagnostic value measurement control means with a correction allowable upper limit value that is set in advance to a value between an average value of each normal diagnostic value, measured in advance a plurality of times using a normal air-fuel ratio sensor, and an average value of each abnormality diagnostic value, measured in advance a plurality of times using an abnormality air-fuel ratio sensor, and, if the diagnostic value is smaller than the correction allowable upper limit value, calculating a disturbance correction value by subtracting a predetermined correction reference value from the diagnostic value, while if the diagnostic value is larger than the correction allowable upper limit value, setting the disturbance correction value to zero for the diagnostic value; and correction means for, at the time of determination by the abnormality determination means, correcting a relative relationship between an average value of the diagnostic values and the abnormality determination value based on an average value of the disturbance correction values.

2. The abnormality diagnosis device for the air-fuel ratio sensor as disclosed in claim 1, wherein the correction allowable upper limit value is set with a value, derived by adding a predetermined value, having a maximum value of eight times a standard deviation of normal distribution of the normal diagnostic values, to an average value of the normal diagnostic values, as a reference.

3. The abnormality diagnosis device for the air-fuel ratio sensor as disclosed in claim 1, wherein the correction allowable upper limit value is set with a value, derived by subtracting a predetermined value, having a maximum value of four times a standard deviation of normal distribution of the abnormality diagnostic values, from an average value of the abnormality diagnostic values, as a reference.

4. The abnormality diagnosis device for the air-fuel ratio sensor as disclosed in claim 1, wherein the correction reference value is set with an average value of the normal diagnostic values as a reference.

5. The abnormality diagnosis device for the air-fuel ratio sensor as disclosed in claim 1, further provided with abnormality determination canceling means for, even when it has been determined by the abnormality determination means that the air-fuel ratio sensor has an abnormality, canceling the determination that the air-fuel ratio sensor has an abnormality when the average value of the diagnostic values is smaller than a second abnormality determination value set larger than the abnormality determination value.

6. The abnormality diagnosis device for the air-fuel ratio sensor as disclosed in claim 1, further provided with abnormality determination canceling means for, even when it has been determined by the abnormality determination means that the air-fuel ratio sensor has an abnormality, canceling the determination that the air-fuel ratio sensor has an abnormality when a minimum value of the diagnostic values is smaller than a third abnormality determination value set smaller than the abnormality determination value.

7. The abnormality diagnosis device for the air-fuel ratio sensor as disclosed in claim 2, wherein the correction allowable upper limit value is set with a value, derived by subtracting a predetermined value, having a maximum value of four times a standard deviation of normal distribution of the abnormality diagnostic values, from an average value of the abnormality diagnostic values, as a reference.

8. The abnormality diagnosis device for the air-fuel ratio sensor as disclosed in claim 2, wherein the correction reference value is set with an average value of the normal diagnostic values as a reference.

9. The abnormality diagnosis device for the air-fuel ratio sensor as disclosed in claim 2, further provided with abnormality determination canceling means for, even when it has been determined by the abnormality determination means that the air-fuel ratio sensor has an abnormality, canceling the determination that the air-fuel ratio sensor has an abnormality when the average value of the diagnostic values is smaller than a second abnormality determination value set larger than the abnormality determination value.

10. The abnormality diagnosis device for the air-fuel ratio sensor as disclosed in claim 2, further provided with abnormality determination canceling means for, even when it has been determined by the abnormality determination means that the air-fuel ratio sensor has an abnormality, canceling the determination that the air-fuel ratio sensor has an abnormality when a minimum value of the diagnostic values is smaller than a third abnormality determination value set smaller than the abnormality determination value.

11. The abnormality diagnosis device for the air-fuel ratio sensor as disclosed in claim 3, wherein the correction reference value is set with an average value of the normal diagnostic values as a reference.

12. The abnormality diagnosis device for the air-fuel ratio sensor as disclosed in claim 3, further provided with abnormality determination canceling means for, even when it has been determined by the abnormality determination means that the air-fuel ratio sensor has an abnormality, canceling the determination that the air-fuel ratio sensor has an abnormality when the average value of the diagnostic values is smaller than a second abnormality determination value set larger than the abnormality determination value.

13. The abnormality diagnosis device for the air-fuel ratio sensor as disclosed in claim 3, further provided with abnormality determination canceling means for, even when it has been determined by the abnormality determination means that the air-fuel ratio sensor has an abnormality, canceling the determination that the air-fuel ratio sensor has an abnormality when a minimum value of the diagnostic values is smaller than a third abnormality determination value set smaller than the abnormality determination value.

14. The abnormality diagnosis device for the air-fuel ratio sensor as disclosed in claim 4, further provided with abnormality determination canceling means for, even when it has been determined by the abnormality determination means that the air-fuel ratio sensor has an abnormality, canceling the determination that the air-fuel ratio sensor has an abnormality when the average value of the diagnostic values is smaller than a second abnormality determination value set larger than the abnormality determination value.

15. The abnormality diagnosis device for the air-fuel ratio sensor as disclosed in claim 4, further provided with abnormality determination canceling means for, even when it has been determined by the abnormality determination means that the air-fuel ratio sensor has an abnormality, canceling the determination that the air-fuel ratio sensor has an abnormality when a minimum value of the diagnostic values is smaller than a third abnormality determination value set smaller than the abnormality determination value.

16. The abnormality diagnosis device for the air-fuel ratio sensor as disclosed in claim 5, further provided with abnormality determination canceling means for, even when it has been determined by the abnormality determination means that the air-fuel ratio sensor has an abnormality, canceling the determination that the air-fuel ratio sensor has an abnormality when a minimum value of the diagnostic values is smaller than a third abnormality determination value set smaller than the abnormality determination value.

* * * * *